United States Patent [19]
Genduso et al.

[11] Patent Number: 5,778,422
[45] Date of Patent: Jul. 7, 1998

[54] DATA PROCESSING SYSTEM MEMORY CONTROLLER THAT SELECTIVELY CACHES DATA ASSOCIATED WITH WRITE REQUESTS

[75] Inventors: Thomas B. Genduso, Apex, N.C.; Edward R. Vanderslice, Boca Raton, Fla.

[73] Assignee: International Business Machines Corporation, Armonk, N.Y.

[21] Appl. No.: 628,230

[22] Filed: Apr. 4, 1996

[51] Int. Cl.$^6$ .................. G06F 12/08; G06F 13/00
[52] U.S. Cl. .............. 711/117; 711/122; 711/138; 711/168; 711/137
[58] Field of Search .................. 395/465, 446, 395/449, 470, 472; 711/122, 117, 138, 145, 137, 168

[56] References Cited

U.S. PATENT DOCUMENTS

| | | | |
|---|---|---|---|
| 4,464,712 | 8/1984 | Fletcher | 711/122 |
| 5,133,058 | 7/1992 | Jensen | 711/207 |
| 5,155,828 | 10/1992 | La Fetra et al. | 711/122 |
| 5,249,282 | 9/1993 | Segers | 711/122 |
| 5,317,718 | 5/1994 | Jouppi | 711/137 |
| 5,367,657 | 11/1994 | Khare et al. | 711/118 |
| 5,377,336 | 12/1994 | Eickemeyer et al. | 395/383 |
| 5,386,547 | 1/1995 | Jouppi | 711/122 |
| 5,561,779 | 10/1996 | Jackson et al. | 711/122 |
| 5,564,035 | 10/1996 | Lai | 711/144 |
| 5,623,628 | 4/1997 | Brayton et al. | 711/141 |

FOREIGN PATENT DOCUMENTS

| | | |
|---|---|---|
| 0 461 925 A2 | 12/1991 | European Pat. Off. |
| 0468831A2 | 1/1992 | European Pat. Off. |
| 0470735A1 | 2/1992 | European Pat. Off. |
| 0604139A1 | 6/1994 | European Pat. Off. |
| 2276964 | 10/1994 | United Kingdom |
| 93/18459 | 9/1993 | WIPO |

OTHER PUBLICATIONS

Effectiveness of Hardware-Based Stride and Sequential Prefetching in Shared-Memory Multiprocessors, by Fredrik Dahlgren and Per Stenstrom, High Performance Computer Architecture 1995 Symposium.

*Primary Examiner*—Eddie P. Chan
*Assistant Examiner*—Hong C. Kim
*Attorney, Agent, or Firm*—Andrew J. Dillon

[57] ABSTRACT

An improved memory controller within a data processing system having a look-aside cache architecture is disclosed. The data processing system includes a processor having an upper level cache associated therewith, a memory controller having an associated controller memory, a processor bus coupled between the processor and the memory controller, and a main memory. The data processing system further includes a lower level cache coupled to the processor bus in parallel with the processor and memory controller. According to a first aspect of the present invention, the memory controller includes logic, which in response to receipt of a write request that will not be serviced by the lower level cache and for which the associated data is not a replaced modified cache line, stores the associated data within the controller memory associated with the memory controller, thereby optimizing data storage within the data processing system. According to a second aspect of the present invention, the memory controller includes logic, which in response to receipt of a request for information residing only in main memory, fetches the requested information from main memory and stores additional information adjacent to said requested data in main memory within a prefetch buffer, thereby minimizing access time to the prefetched information.

19 Claims, 6 Drawing Sheets

DATA PROCESSING SYSTEM MEMORY CONTROLLER THAT SELECTIVELY CACHES DATA ASSOCIATED WITH WRITE REQUESTS

BACKGROUND OF THE INVENTION

1. Technical Field

The present invention relates in general to a data processing system and in particular to an apparatus for managing data storage within a data processing system. Still more particularly, the present invention relates to a memory controller within a data processing system having a look-aside cache architecture which caches stack operations and prefetches selected information for possible subsequent access by the processor.

2. Description of the Related Art

To decrease latency, data processing systems increasingly utilize some configuration of cache memory. As is well-known to those skilled in the art, a cache is a small amount of fast, expensive, zero wait state memory utilized to store a copy of frequently accessed instructions and data residing in main memory. The latest generation of personal computers, which utilize 80486, Intel Pentium™, IBM PowerPC™, or similar processors typically include an on-chip level one (L1) processor cache. In addition, these personal computers frequently include a level two (L2) cache to further enhance system performance. Cache systems having both L1 and L2 caches are typically configured in one of two ways. In the first cache system configuration, the L2 cache is interfaced in a serial fashion between the processor and the system or memory bus. In this configuration, commonly referred to as a look-through or in-line configuration, the processor cannot communicate directly with the memory or system bus, but communicates through the interface provided by the L2 cache controller.

Although an in-line L2 cache configuration generally provides optimal performance, many personal computer systems are designed to support optional L2 caches in a look-aside configuration in order to lower the price of an entry-level computer system while providing the option to install an L2 cache to improve performance. In a look-aside configuration, the L2 cache is coupled to the processor bus in parallel with both the processor and the memory controller and may therefore conveniently be mounted on a pluggable module connected with the processor bus.

In computer systems which utilize a look-aside L2 cache configuration, the L2 cache and memory controller each begin a processor memory read cycle simultaneously in response to the processor initiating a memory read. In response to an L2 cache read hit, the L2 cache signals the memory controller to abort the indicated memory read and returns the requested data to the processor in zero wait states. However, in the event of an L2 cache read miss, the memory controller fetches the requested data from main memory and returns the data to the processor as if the L2 cache were not present. Since the L2 cache and the memory controller both begin to service a processor data read request simultaneously, a computer system having a look-aside cache architecture incurs no added penalty for an L2 cache miss during a data read.

Implementing an L2 cache within a computer system utilizing a look-aside configuration typically has a concomitant performance penalty, however. For example, in the case of a cache miss of a look-aside L2 cache during a data write, a performance penalty is incurred since the L2 cache cannot obtain control of the processor bus in order to fetch the requisite cache line while the processor is writing the data to the memory controller. Consequently, look-aside L2 caches typically do not implement cache line allocation on write misses. In addition, contention for the processor bus also reduces system performance during I/O operations because the processor cannot access the L2 cache during an I/O operation. A further limitation of a look-aside L2 cache configuration is that it does not efficiently support cache line sizes larger than the L1 cache line size. In contrast, in-line L2 cache lines are frequently designed to be twice the length of L1 cache lines in order to reduce cache miss ratios by prefetching instructions and data based upon the statistical probability of data locality.

As should thus be apparent, it would be desirable to provide an improved method and system for implementing an optional look-aside L2 cache within a data processing system. In particular, it would be desirable to provide an improved cache system within a data processing system having a look-aside L2 cache configuration which support allocation on L2 write misses and which enable the prefetching of data and instructions.

SUMMARY OF THE INVENTION

It is therefore one object of the present invention to provide an improved data processing system.

It is another object of the present invention to provide an improved apparatus for managing data storage within a data processing system.

It is yet another object of the present invention to provide an improved memory controller within a data processing system having a look-aside cache architecture which caches stack operations and prefetches selected information for possible subsequent access by the processor.

The foregoing objects are achieved as is now described. An improved memory controller within a data processing system having a look-aside cache architecture is disclosed. The data processing system includes a processor having an upper level cache associated therewith, a memory controller having an associated controller memory, a processor bus coupled between the processor and the memory controller, and a main memory. The data processing system further includes a lower level cache coupled to the processor bus in parallel with the processor and memory controller. According to a first aspect of the present invention, the memory controller includes logic, which in response to receipt of a write request that will not be serviced by the lower level cache and for which the associated data is not a replaced modified cache line, stores the associated data within the controller memory associated with the memory controller, thereby optimizing data storage within the data processing system. According to a second aspect of the present invention, the memory controller includes logic, which in response to receipt of a request for information residing only in main memory, fetches the requested information from main memory and stores additional information adjacent to said requested data in main memory within a prefetch buffer, thereby minimizing access time to the prefetched information.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
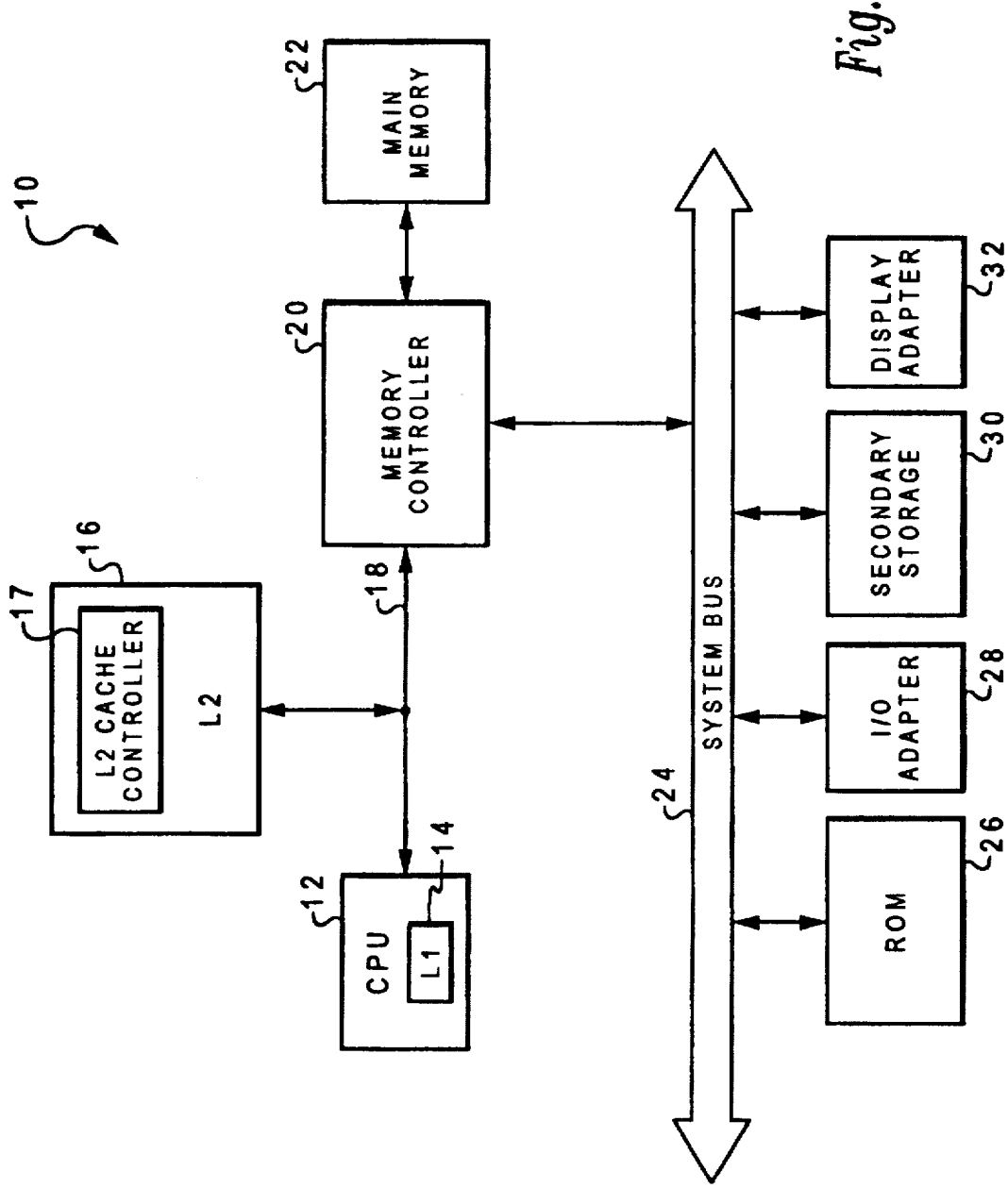
FIG. 1 illustrates a high-level block diagram of a data processing system in accordance with the method and system of the present invention.

With reference now to the figures and in particular with reference to FIG. 1, there is illustrated a block diagram of a preferred embodiment of a data processing system in accordance with the method and system of the present invention. As will be appreciated by those skilled in the art, many of the details of data processing system 10 that are not relevant to the present invention have been omitted for the purpose of clarity. As illustrated, data processing system 10 includes a central processing unit (CPU) 12 which executes software instructions. While any appropriate microprocessor can be utilized for CPU 12, CPU 12 is preferably one of the PowerPC™ line of microprocessors available from IBM Microelectronics. Alternatively, CPU 12 can be implemented as an Intel Pentium™ or an 80486 microprocessor. To improve data and instruction access times, CPU 12 is equipped with an on-board level one (L1) cache 14. Although in the following description the cache line size of L1 cache 14 is described as being X bytes in length, in a preferred embodiment of the present invention in which the word length of CPU 12 is 8 bytes, the cache line length of L1 cache 14 is 32 bytes. CPU 12 is coupled to processor bus 18, which preferably has a bandwidth of 8 bytes, to facilitate communication of data and instructions between CPU 12, L2 cache 16 and memory controller 20.

As depicted, L2 cache 16 is coupled to processor bus 18 in parallel with CPU 12 and memory controller 20 in a look-aside cache configuration. Accordingly, read and write requests transmitted by CPU 12 via processor bus 18 are received concurrently by memory controller 20 and L2 cache 16. In response to an L2 cache hit, L2 cache 16 signals memory controller 20 to abort the indicated operation and returns the requested data to CPU 12 in zero wait states. L2 cache 16 preferably has a cache line length of X bytes to avoid the complications inherent in supporting multiple caches having diverse cache line sizes on a shared bus. As illustrated, L2 cache 16 includes an L2 cache controller 17, which controls the operation of L2 cache 16. Thus, L2 cache controller 17 maintains L2 cache coherency by enforcing a selected coherency protocol, determines whether data associated with memory addresses within main memory 22 are cacheable, or capable of residing within L2 cache 16, and performs many other conventional cache management functions.

Data processing system 10 further includes memory controller 20. Memory controller 20 contains logic circuitry which fetches data and instructions from main memory 22 in response to receipt of read and write requests from CPU 12 which cannot be serviced by L2 cache 16. Thus, memory controller 20 provides a memory interface between CPU 12 and main memory 22. In addition, memory controller 20 includes logic circuitry which provides a system bus interface between system bus 24 and CPU 12 and main memory 22. In a preferred embodiment of the present invention, the system bus interface within memory controller 20 supports memory mapped I/O by transmitting data received from CPU 12 to system bus 24 if the specified address maps to an address assigned to an I/O device.

As is further illustrated within FIG. 1, data processing system 10 includes read only memory (ROM) 26, I/O adapter 28, secondary storage 30, and display adapter 32, which are each coupled to system bus 24. ROM 26 and secondary storage 30 provide storage for operating system and application programs and data. I/O adapter 28 supports the attachment of input devices, such as a mouse and keyboard, to data processing system 10 to enable a user to input data and instructions. Display adapter 32 enables the attachment of a video display device to output data to a user.

Figure 2:
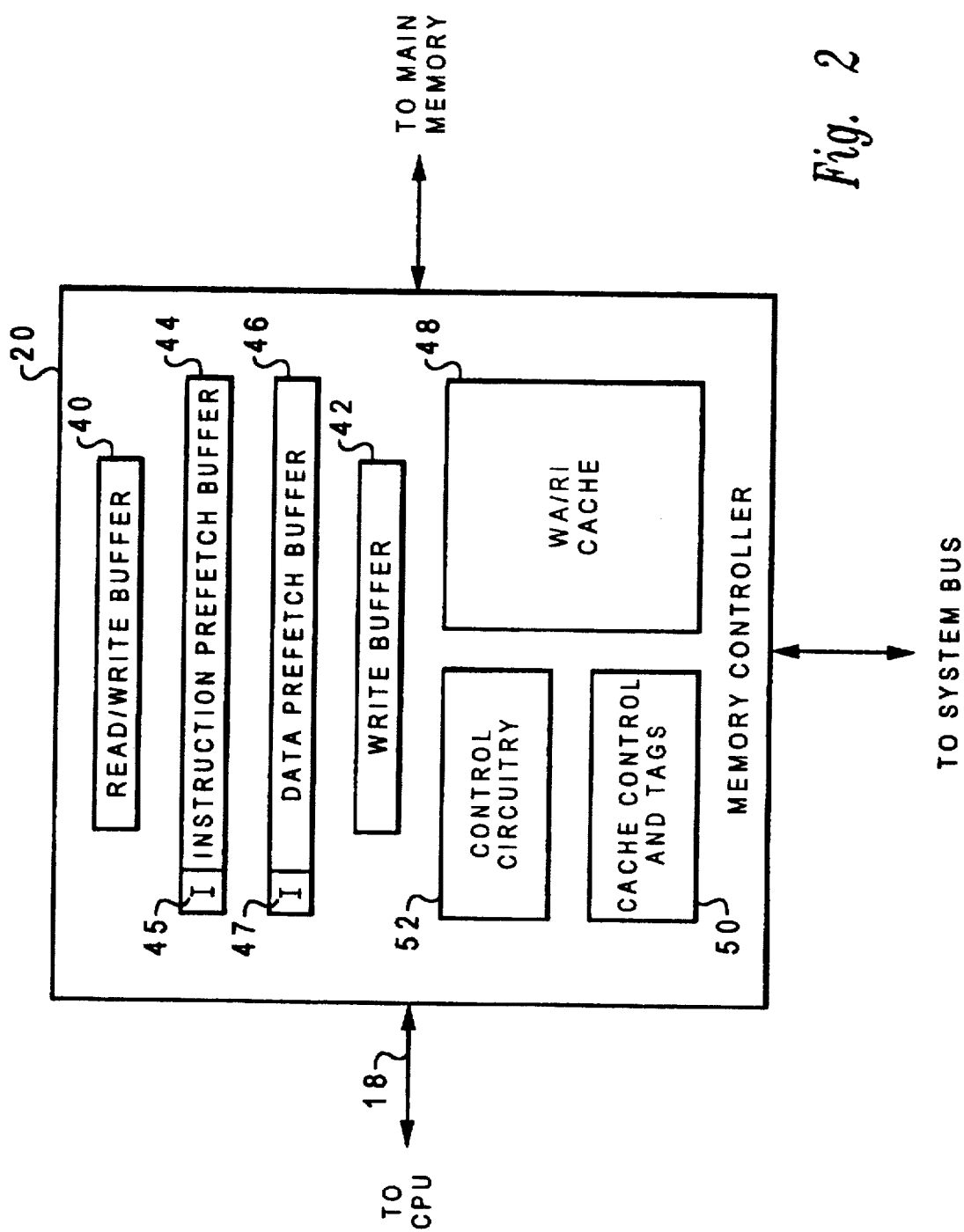
FIG. 2 depicts a more detailed block diagram of a memory controller in accordance with the method and system of the present invention.

Referring now to FIG. 2, there is depicted a more detailed pictorial representation of the logical structure of memory controller 20 in accordance with the method and system of the present invention. As illustrated, memory controller 20 contains a conventional read/write buffer 40 and write buffer 42. Read/write buffer 40 is utilized to buffer data transmitted to and received from CPU 12 via processor bus 18. Write buffer 42 is utilized to buffer data to be written to main memory 22. Each of read/write buffer 40 and write buffer 42 preferably has the same length as a cache line of L1 cache 14 in order to support efficient data transfers, for example, burst transfers between memory controller 20 and CPU 12.

In accordance with the present invention, memory controller 20 further includes an instruction prefetch buffer (IPB) 44 and a data prefetch buffer (DPB) 46. IPB 44 and DPB 46 are utilized by memory controller 20 to prefetch data and instructions for CPU 12. As described above, based upon the principle of locality of reference, it has been shown that cache miss ratios are greatly reduced by implementing a 2:1 L2 to L1 cache line size ratio in order to prefetch an additional L1 cache line of data and instructions during each fetch from memory. Because diverse L2 and L1 cache line sizes are not easily supported when a look-aside cache configuration is utilized, memory controller 20 fetches two cache lines of data or instructions from main memory 22 during particular fetch operations and stores the data or instructions contained within the cache line not immediately requested by CPU 12 within the appropriate one of IPB 44 and DPB 46. Thus, as will be described in greater detail below, memory controller 20 supports the prefetching of data and instructions in conjunction with a look-aside configuration of L2 cache 16.

According to another aspect of the present invention, memory controller 20 also includes write allocate/read invalidate (WA/RI) cache 48 and its associated cache control and tags 50. Within conventional data processing systems which implement a look-aside L2 cache, the memory controller simply writes data received from the processor to the main memory in response to an L2 cache write miss. Thus, a conventional look-aside cache typically does not allocate a cache line in response to a write miss. This storage management policy is beneficial if the data to be written is a replaced L1 or L2 cache line since the probability that the replaced cache line will soon be accessed again is small. However, if the data write is a stack operation, failure to allocate a cache line in response to a write miss degrades system performance.

As is well known to those skilled in the art, a stack is a logical first-in/last-out (FILO) queue which is utilized to save parameters during procedure calls and other software operations which save parameters. Stack operations tend to write parameters to a data location first (a "push") and thereafter read the data location (a "pop"). Since the stack data will typically be read only once, stack data is considered invalid following a pop. According to the present invention, in order to efficiently support push stack operations, WA/RI cache 48 within memory controller 20 allocates a cache line on write misses of L2 cache 16 that are single word (non-burst) writes. WA/RI cache 48 does not allocate a cache line on multiple-word writes (burst writes) since burst writes typically represent replaced cache lines that no longer need to be cached. In addition, WA/RI cache 48 invalidates data following a read hit (a pop).

Figure 3:
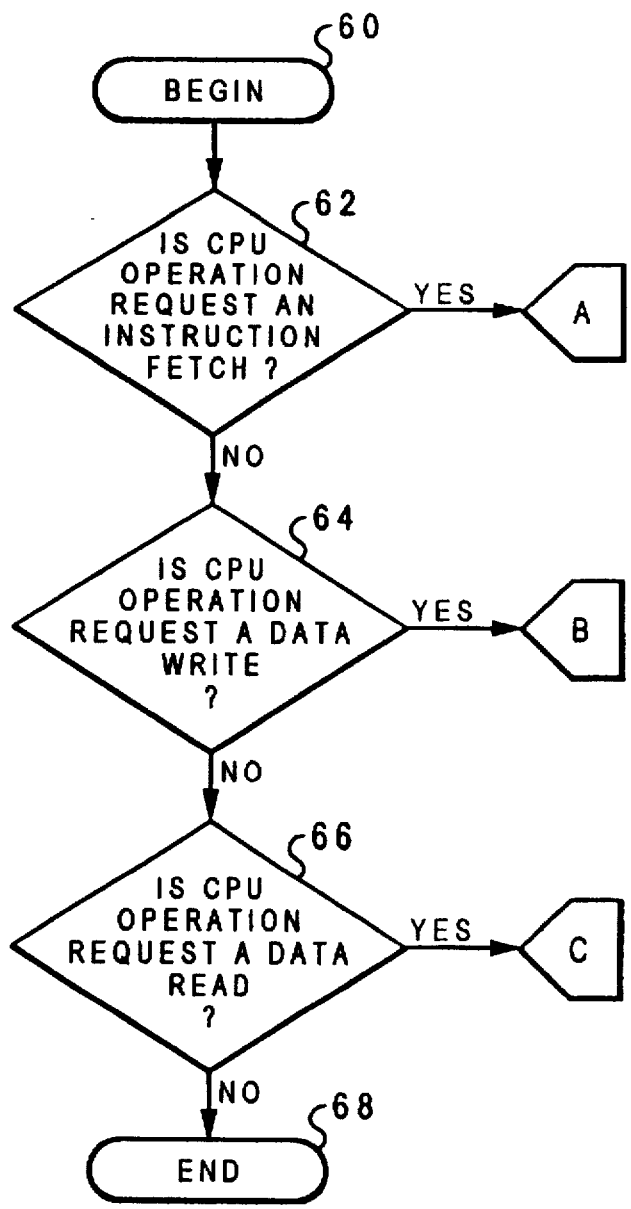
FIG. 3 illustrates a high-level logic flowchart of a preferred embodiment of the method of the present invention.

Finally, memory controller 20 includes control circuitry 52, which manages the operation of memory controller 20 in accordance with the logical process illustrated within FIGS. 3–6. Upon review of FIGS. 3–6 those skilled in the art will appreciate that many operations depicted in a serial fashion therein may in practice be performed in parallel. With reference first to FIG. 3, there is illustrated a high-level logic flowchart of the operation of memory controller 20 in accordance with the method and system of the present invention. As illustrated, the process begins at block 60 and thereafter proceeds to block 62, which illustrates a determination of whether or not an operation request received from CPU 12 via processor bus 18 is an instruction fetch request. In response to a determination that the operation request is not an instruction fetch request, the process passes to block 64. However, in response to a determination that the operation request is an instruction fetch request, the process proceeds through off-page connector A to on-page connector A of FIG. 4.

Figure 4:
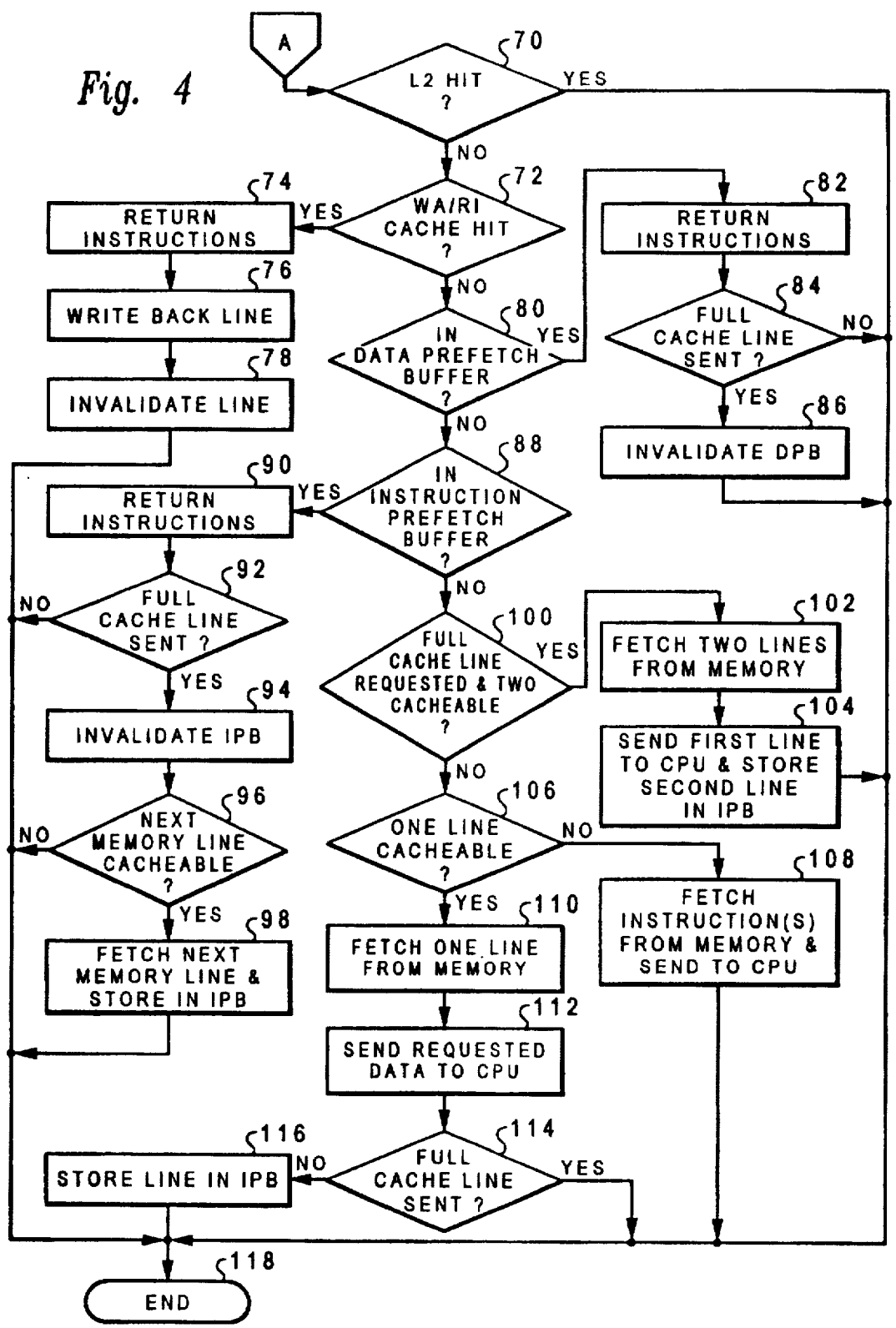
FIG. 4 is a high-level logic flowchart of a preferred embodiment of the method utilized by a memory controller which employs the present invention to service an instruction fetch request.

Referring now to FIG. 4, there is depicted a high-level logic block diagram of a preferred embodiment of the process utilized by memory controller 20 to prefetch instructions in accordance with the method and system of the present invention. As illustrated, the process proceeds from on-page connector A to block 70, which depicts a determination of whether or not the instruction fetch request resulted in an L2 cache hit. If L2 cache 16 stores the requested instructions, L2 cache 16 signals memory controller 20 to abort its operation. Therefore, if the instructions associated with a specified memory address are stored within L2 cache 16, the process proceeds from block 70 to block 118 and terminates. However, if a determination is made at block 70 that the instruction fetch request resulted in a L2 cache miss, L2 cache 16 cannot service the instruction fetch request and the process passes to block 72.

Block 72 depicts a determination of whether or not the instructions specified by the instruction fetch request are stored within WA/RI cache 48. If not, the process passes from block 72 to block 80. However, if a determination is made at block 72 that WA/RI cache 48 stores the requested instructions, the process proceeds from block 72 to blocks 74–78, which illustrate memory controller 20 transmitting the requested instructions to CPU 12 via processor bus 18, writing back the WA/RI cache line containing the requested instructions to main memory 22, and invalidating the WA/RI cache line containing the requested instructions. Thereafter, the process passes to block 118 and terminates. Returning to block 72, if a determination is made that the requested instructions are not stored within WA/RI cache 48, the process passes to block 80, which illustrates a determination of whether or not the requested instructions are stored within DPB 46. Although the operation request issued by CPU 12 is an instruction fetch request, memory controller 20 determines whether DPB 46 stores the requested instructions since computer architectures typically permit information to be accessed as instructions or data in order to support self-modifying code. In response to a determination that the requested instructions are stored within DPB 46, the process passes from block 80 to block 82, which illustrates memory controller 20 transmitting the requested instructions to CPU 12. Next, the process proceeds to blocks 84–86, which illustrate invalidating DPB 46 by setting invalid bit 47 if a full L1 cache line was transmitted to CPU 12. The process then passes to block 118 and terminates.

Returning to block 80, if a determination is made that the requested instructions are not stored within DPB 46, the process passes to block 88, which depicts a determination of whether or not the requested instructions are stored within IPB 44. In response to a determination that the requested instructions are stored within IPB 44, the process proceeds to block 90, which illustrates memory controller 20 transmitting the requested instructions to CPU 12. Next, the process passes to block 92, which depicts determining whether or not a full L1 cache line of instructions was transmitted to CPU 12. If not, the process simply passes to block 118 and terminates. However, if a full L1 cache line was transmitted, the process proceeds to block 94, which illustrates memory controller 20 invalidating the contents of IPB 44 by setting invalid bit 45. The process then proceeds to block 96, which depicts a determination of whether or not the X bytes (X is the cache line length of L1 cache 14) that follow the requested instructions within main memory 22 are cacheable. If not, the process passes to block 118 and terminates. However, if a determination is made that the next X bytes within main memory 22 are cacheable, the process proceeds to block 98, which illustrates memory controller 20 fetching the X bytes following the requested instructions, storing them within IPB 44, and clearing invalid bit 45. Thereafter, the process passes to block 118 and terminates.

Returning to block 88, if a determination is made that the requested instructions do not reside within IPB 44, the process passes to block 100, which depicts a determination of whether or not the requested instructions represent a full L1 cache line and whether or not both the addresses containing the requested instructions and the following X bytes of information are both cacheable. If so, the process proceeds to block 102, which depicts fetching two L1 cache line lengths of bytes of information from main memory 22. Then, as illustrated at block 104, memory controller 20 transmits the first X bytes of instructions to CPU 12 and stores the second X bytes within IPB 44. Thus, memory controller 20 effectively prefetches a second L1 cache line of instructions because of the likelihood of a subsequent request for instructions within the second X bytes of information. The process then passes to block 118 and terminates.

Returning to block 100, if a determination is made that either a full L1 cache line was not requested by CPU 12 or that 2× bytes are not cacheable, the process passes to block 106, which illustrates a determination of whether or not the X bytes within main memory 22 which contain the address of the requested instruction(s) are cacheable. If not, the process passes to block 108, which depicts memory controller 20 fetching the requested instruction(s) from main memory 22 and sending the requested instructions to CPU 12. The process then passes to block 118 and terminates. However, if a determination is made at block 106 that X bytes of information containing the requested instructions are cacheable, the process passes to block 110 and 112, which illustrate memory controller 20 fetching the X bytes containing the requested instructions from main memory 22 and transmitting the requested instructions to CPU 12. Next, a determination is made at block 114 whether or not X bytes, which comprise a full L1 cache line, were sent to CPU 12. If so, the process passes to block 118 and terminates. However, if less than a full cache line of instructions was sent to CPU 12, the process passes to block 116, which depicts storing the X fetched bytes of information within IPB 44 and marking them valid by clearing invalid bit 45. Thereafter, the process passes to block 118 and terminates.

Referring again to FIG. 3, if a determination is made at block 62 that the CPU operation request received by memory controller 20 is not an instruction fetch request, the process passes to block 64, which depicts a determination of whether or not the CPU operation request is a data write request. If so, the process proceeds from block 64 through off-page connector B to FIG. 5, which illustrates a preferred embodiment of the process utilized by memory controller 20 to service data write requests.

Figure 5:
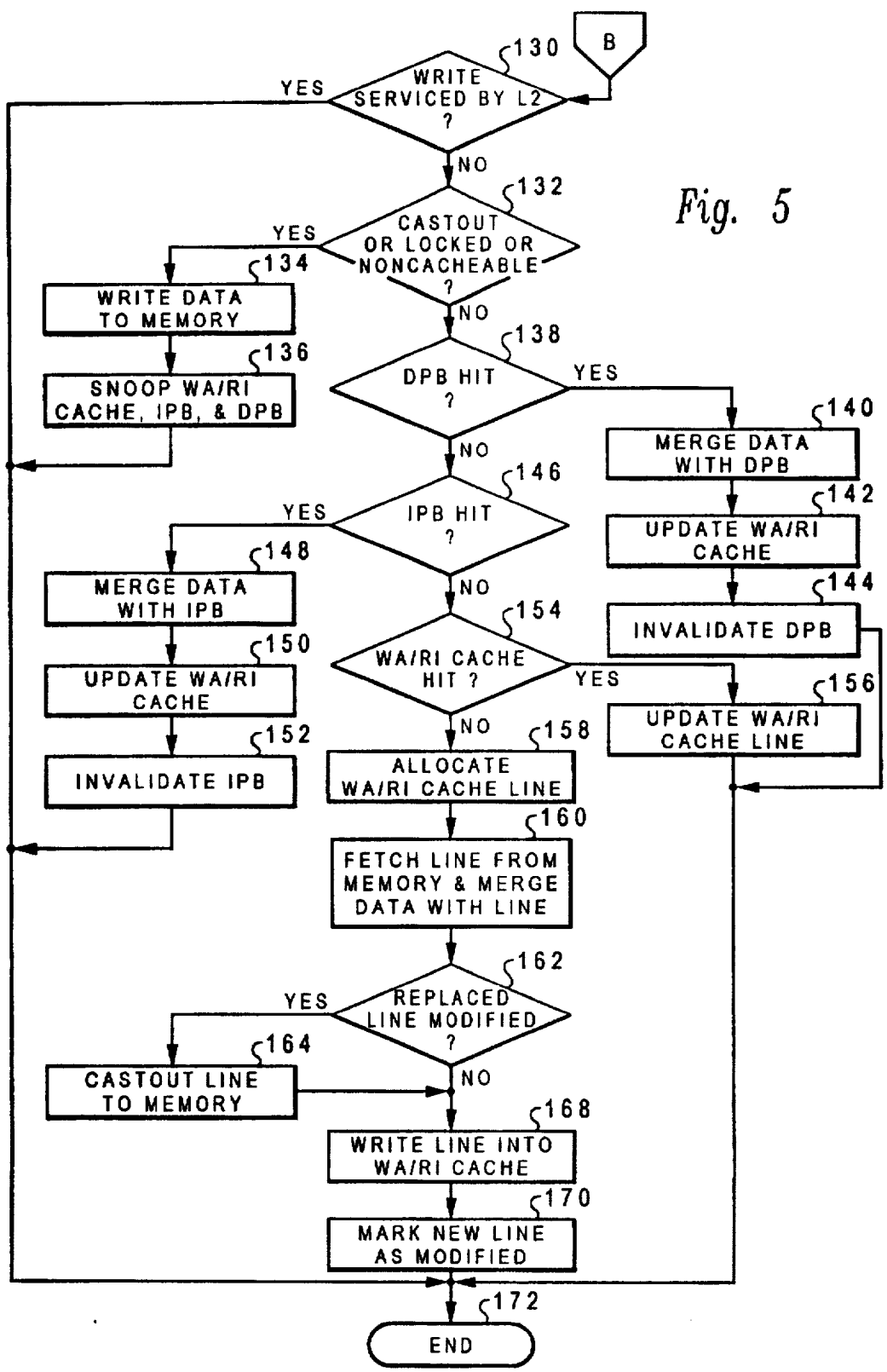
FIG. 5 is a high-level logic flowchart of a preferred embodiment of the method utilized by a memory controller which employs the present invention to service a data write request.

With reference now to FIG. 5, the process utilized by memory controller 20 to service data write requests begins at on-page connector B and thereafter proceeds to block 130, which illustrates a determination of whether or not the data write request will be serviced by L2 cache 16. As described above with reference to the instruction fetch request, L2 cache 16 signals that a copy of the data stored at the specified address resides within L2 cache 16 by transmitting an abort signal to memory controller 20. In response to receipt of the abort signal indicating that the write request will be serviced by L2 cache 16, the process proceeds from block 130 to block 172, where the process terminates. However, in response to a determination that the data write request will not be serviced by L2 cache 16, the process proceeds from block 130 to block 132, which illustrates a determination of whether or not the data associated with the data write request is a cache line cast out of (replaced from) L1 cache 14 or L2 cache 16 or is locked or is otherwise noncacheable. If so, the process proceeds from block 132 to block 134, which depicts memory controller 20 writing the data associated with the data write request to the specified address within main memory 22. Next, as depicted at block 136, memory controller 20 snoops WA/RI cache 48, IPB 44, and DPB 46 and invalidates any data within memory controller 20 corresponding to the specified address. The process then passes to block 172 and terminates. Returning to block 132, if a determination is made that the data associated with the data write request is not a cache line cast out of L1 cache 14 or L2 cache 16 or locked or noncacheable, the process passes to block 138, which depicts determining whether or not DPB 46 stores data corresponding to the specified addresses. If so, the process proceeds from block 138 to block 140, which illustrates merging the data associated with the data write request with the data stored within DPB 46. Next, as illustrated at block 142, the information within DPB 46 is written into WA/RI cache 48. Thereafter, the contents of DPB 46 are invalidated by setting invalid bit 47 and the process passes to block 172, where the process terminates.

Returning to block 138, if a determination is made that DPB 46 does not contain data associated with the specified address, the process proceeds from block 138 to block 146, which illustrates a determination of whether or not IPB 44 stores information associated with the specified addresses. If so, the process proceeds to blocks 148–152, which like block 140–144, depict memory controller 20 merging the data associated with the data write request with the contents of IPB 44, storing the content of IPB 44 within WA/RI cache 48, and thereafter invalidating IPB 44 by setting invalid bit 45. The process then passes to block 172 and terminates. Returning to block 146, if a determination is made that IPB 44 does not store information associated with a specified address, the process proceeds from block 146 to block 154, which illustrates a determination of whether or not information associated with the specified address is stored within WA/RI cache 48. The determination illustrated at block 154 is preferably made by comparing selected bits within the specified address with address tags stored within cache control and tags 50. If the selected bits within the specified address match one of the address tags stored within cache control and tags 50, indicating that WA/RI cache 48 stores information associated with the specified address, the process passes from block 154 to block 156, which illustrates memory controller 20 updating a WA/RI cache line with the data associated with the data write request. The process then passes to block 172 and terminates.

Returning to block 154, if a determination is made that the data write request results in a cache miss of WA/RI cache 48, the process proceeds from block 154 to block 158, which illustrates allocating a cache line within WA/RI cache 48 for the data associated with the data write request. Next, as depicted at block 160, memory controller 20 fetches X bytes of data containing the specified address from main memory 22 and stores the fetched data within read/write buffer 40. In addition, memory controller merges the data associated with the data write request with the contents of read/write buffer 40. The process then proceeds to block 162, which illustrates a determination of whether or not the replaced WA/RI cache line has been modified. For example, the determination depicted at block 162 may be made by examining the coherency protocol bit associated with the cache line. If the cache line is marked as dirty, the process proceeds to block 164, which illustrates writing the replaced WA/RI cache line to main memory 22. The process then proceeds from either block 164 or block 162 to block 168, which depicts storing the contents of read/write buffer 40 into the allocated WA/RI cache line. The cache line is then marked as modified (valid) as illustrated at block 170. Thereafter, the process passes to block 172 and terminates.

Figure 6:
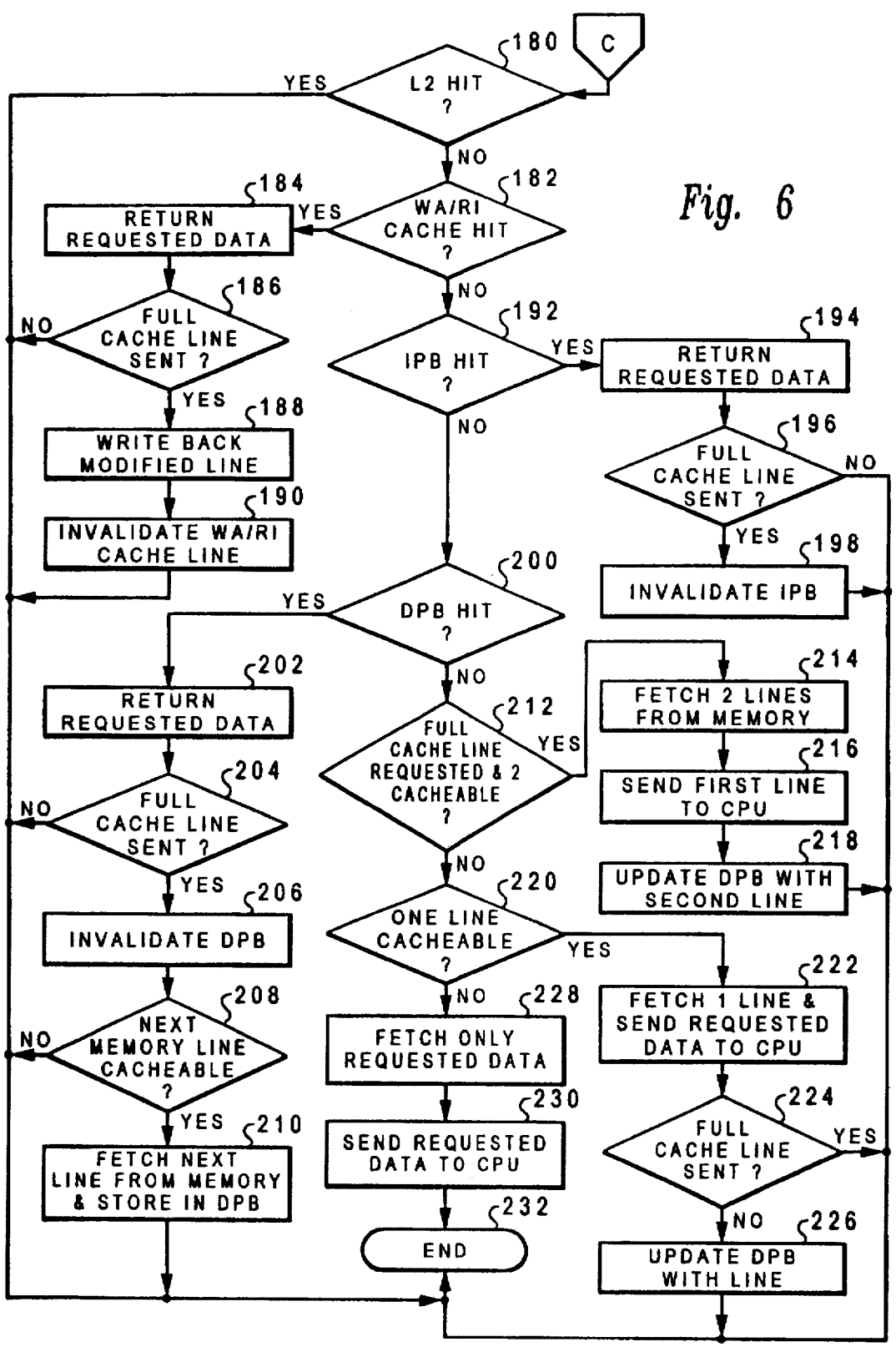
FIG. 6 is a high-level logic flowchart of a preferred embodiment of the method utilized by a memory controller which employs the present invention to service a data read request.

Referring again to FIG. 3, if a determination is made at block 64 that the CPU operation request received at memory controller 20 is not a data write request, the process passes to block 66, which depicts a determination of whether or not the CPU operation request is a data read request. If not, the process passes to block 68 and terminates. However, if a determination is made at block 66 that the CPU operation request is a data read request, the process proceeds through off-page connector C to on-page connector C of FIG. 6. Referring now to FIG. 6, there is illustrated a high-level flowchart of a preferred embodiment of the method utilized by the present invention to service a data read request. As illustrated, the process passes from on-page connector C to block 180, which illustrates a determination of whether or not the CPU operation request will be serviced by L2 cache 16. If so, the process simply passes to block 232 and terminates. However, if a determination is made at block 180 that L2 cache 16 will not service the CPU operation request, the process passes to block 182, which illustrates a determination of whether or not data associated with the address specified within the data read request is stored within WA/RI cache 48. If so, the process proceeds from block 182 to blocks 184-190, which depict the read invalidate operation of WA/RI cache 48. First, as illustrated at block 184, the data associated with the address specified within the data read request is transmitted to CPU 12 via processor bus 18. Next, the process passes to block 186, which illustrates a determination of whether or not X bytes of data, a full L1 cache line, were transmitted to CPU 12. If not, the process passes to block 232 and terminates. However, if a full L1 cache line was transmitted to CPU 12, the process proceeds to block 188-190, which depict memory controller 20 writing back the WA/RI cache line containing the requested data to main memory 22 and marking the cache line invalid. The process then passes to block 232 and terminates.

Returning to block 182, if a determination is made that the requested data is not stored within WA/RI cache 48, the process proceeds to block 192, which depicts a determination of whether or not the requested data is stored within IPB 44. In response to a determination that the requested information is stored within IPB 44, the process proceeds to block 194, which illustrates returning the requested data to CPU 12. Then, as depicted at block 196, a determination is made whether or not the requested data comprised a full L1 cache line. If not, the process passes to block 232 and terminates. However, if a determination is made that the requested data comprised a full L1 cache line, the process proceeds to block 198, which illustrates invalidating the contents of IPB 44 by setting invalid bit 45. The process then passes to block 232 and terminates. Returning to block 192, if a determination is made that IPB 44 does not contain the requested data, the process passes to block 200, which depicts a determination of whether or not the requested data resides within DPB 46. If so, the process proceeds to block 200 to block 202, which illustrates returning the requested data to CPU 12. Next, as depicted at block 204, a determination is made whether or not the requested data comprised a full L1 cache line. If not, the process passes to block 232 and terminates. However, if the requested data comprised a full L1 cache line, the process proceeds to block 206, which illustrates memory controller 20 invalidating the contents of DPB 46 by setting invalid bit 47. The process proceeds from block 206 to block 208, which depicts a determination of whether or not the X bytes within main memory 22 which follow the X bytes of requested data are cacheable. If not, the process passes to block 232 and terminates. However, in response to a determination that the next X bytes of information within main memory 22 are cacheable, the process passes from block 208 to block 210, which depicts memory controller 20 fetching the subsequent X bytes of information from main memory 22 and storing them within DPB 46. In addition, memory controller 20 marks DPB as valid by clearing invalid bit 47. Block 210 again illustrates memory controller 20 prefetching data based upon the principle of locality of reference in order to potentially avert future main memory accesses which result from L2 cache misses.

Returning to block 200, if a determination is made that the requested data does not reside within DPB 46, the requested data must be fetched from main memory 22 and the process passes to block 212. Block 212 depicts a determination of whether or not the data read request requests X bytes of information and whether or not the 2x bytes of information within main memory 22 containing the specified address are cacheable. If so, the process proceeds from block 212 to block 214, which illustrates fetching the 2x bytes of information containing the specified address from main memory 22. Then, as depicted at blocks 216-218, memory controller 20 transmits the first X bytes of information to CPU 12 and stores the second X bytes of information within DPB 46, marking them valid by clearing invalid bit 47. Thereafter, the process terminates at block 232. Returning to block 212, if a determination is made that the requested data does not comprise a full L1 cache line or that two cache lines of data are not cacheable, the process passes to block 220, which depicts determining whether or not the X bytes of information following the specified address within main memory are cacheable. If so, the process proceeds from block 220 to block 222, which depicts fetching the X bytes of data following the specified address from main memory 22 and sending the requested data to CPU 12. Next, as illustrated at block 224, a determination is made whether or not the requested data comprises a full L1 cache line. If so, the process passes to block 232 and terminates. However, if the requested data does not comprise a full L1 cache line, the process proceeds to block 226, which illustrates memory controller 20 storing the X bytes of data fetched from main memory 22 within DPB 46 and clearing invalid bit 47. The process then passes to block 232 and terminates.

Returning to block 220, if a determination is made that the X bytes of data within main memory 22 containing the specified address are not cacheable, the process proceeds to blocks 228-230, which depicts memory controller 20 fetching only the requested data from main memory 22 and transmitting the requested data to CPU 12. Thereafter, the process terminates at block 232.

As should thus be apparent, the present invention provides an improved method and system for managing the storage of data within a data processing system having a look-aside cache configuration. In particular, the present invention optimizes data access times by providing a write-allocate/read-invalidate (WA/RI) cache within the memory controller in order to efficiently handle stack operations. Furthermore, according to the present invention, the memory controller includes prefetch buffering in order to minimize the latency incurred by L2 look-aside cache misses.

While the invention has been particularly shown and described with reference to a preferred embodiment, it will be understood by those skilled in the art that various changes in form and detail may be made therein without departing from the spirit and scope of the invention.

What is claimed is:

1. A memory controller for managing storage of data within a data processing system having a look aside cache configuration, said data processing system including a processor having an upper level cache associated therewith, a controller memory coupled to said memory controller, a main memory coupled to said memory controller, a processor bus coupled between said processor and said memory controller, and a lower level cache in a look aside configuration, said look aside configuration being defined by said lower level cache being coupled to said processor bus in parallel with said processor such that all write requests not serviced by said upper level cache are transmitted on said processor bus and are received concurrently by both said memory controller and said lower level cache, wherein said upper level cache and said lower level cache each include one or more cache lines, said memory controller comprising:

means, responsive to concurrent receipt at both said lower level cache and said memory controller of a write request and associated data for a specified address within said main memory, for determining if said write request will be serviced by said lower level cache and for determining if said associated data is a modified cache line replaced from either said upper level cache or said lower level cache;

means, responsive to a determination that said write request will not be serviced by said lower level cache and that said associated data is a modified cache line replaced from either said upper level cache or said lower level cache, for storing said associated data at said specified address within said main memory; and means, responsive to a determination that said write request will not be serviced by said lower level cache and that said associated data is not a modified cache line replaced from said upper level cache or said lower level cache, for storing said associated data within said controller memory associated with said memory controller.

2. The memory controller of claim 1, and further comprising:

means, responsive to an access of said associated data by said processor, for invalidating said associated data within said controller memory.

3. The memory controller of claim 1, said controller memory comprising an on-board cache memory within said memory controller.

4. The memory controller of claim 1, wherein said means, responsive to a determination that said write request will not be serviced by said lower level cache and that said associated data is a modified cache line replaced from either said upper level cache or said lower level cache, for storing said associated data at said specified address within said main memory comprises:

means, responsive to a determination that said write request will not be serviced by said lower level cache and that said associated data is a modified cache line replaced from either said upper level cache or said lower level cache, for storing said associated data at said specified address only within said main memory.

5. The memory controller of claim 1, wherein said means, responsive to a determination that said write request will not be serviced by said lower level cache and that said associated data is not a modified cache line replaced from said upper level cache or said lower level cache, for storing said associated data within said controller memory associated with said memory controller comprises:

means, responsive to a determination that said write request will not be serviced by said lower level cache and that said associated data is not a modified cache line replaced from said upper level cache or said lower level cache, for storing said associated data only within said controller memory associated with said memory controller.

6. The memory controller of claim 1, said memory controller further comprising:

means, responsive to a determination that a data request by the processor will not be serviced by said upper level cache or said lower level cache, for determining whether or not requested data specified by said data request is stored by said memory controller; and means, responsive to a determination that said requested data is stored by said memory controller, for transmitting said requested data to said processor.

7. The memory controller of claim 6, wherein said requested data comprises at least one instruction.

8. The memory controller of claim 1, wherein said upper level cache in integrated into said processor, and wherein all data transmitted on said processor bus by said memory controller is received by said lower level cache and said processor substantially concurrently.

9. The memory controller of claim 1, wherein said associated data is a modified cache line replaced from said upper level cache.

10. The data processing system of claim 1, wherein said associated data is a modified cache line replaced from said upper level cache.

11. A data processing system, comprising:

a processor;

a processor bus coupled to said processor;

an upper level cache coupled to said processor;

a lower level cache coupled to said processor bus in a look aside configuration, said look aside configuration being defined by said lower level cache being coupled to said processor bus in parallel with said processor such that all write requests not serviced by said upper level cache are transmitted on said processor bus and are received by said lower level cache;

a main memory; and a memory controller coupled to said main memory and to said processor bus such that all write requests transmitted on said processor bus are received by said memory controller concurrently with said lower level cache, said memory controller having a controller memory and control logic that controls access to said main memory, wherein in response to receipt of a write request and associated data for a specified address within said main memory that will not be serviced by said lower level cache and for which said associated data is not a modified cache line replaced from said upper level cache or said lower level cache, said control logic stores said associated data within said controller memory; and a system bus coupled to said memory controller.

12. The data processing system of claim 11, wherein said control logic of said memory controller further comprises means for invalidating data stored within said controller memory in response to an access of said data by said processor.

13. The data processing system of claim 11, wherein said controller memory comprises an on-board cache memory within said memory controller.

14. The data processing system of claim 11, said data processing system further comprising:

means, responsive to a determination that said write request will not be serviced by said lower level cache and that said associated data is a modified cache line replaced from either said upper level cache or said lower level cache, for storing said associated data at said specified address within said main memory.

15. The data processing system of claim 14, wherein said means, responsive to a determination that said write request will not be serviced by said lower level cache and that said associated data is a modified cache line replaced from either said upper level cache or said lower level cache, for storing said associated data at said specified address within said main memory comprises:

means, responsive to a determination that said write request will not be serviced by said lower level cache and that said associated data is a modified cache line replaced from either said upper level cache or said lower level cache, for storing said associated data at said specified address only within said main memory.

16. The data processing system of claim 11, wherein in response to a determination that said write request will not be serviced by said lower level cache and that said associated data is not a modified cache line replaced from said upper level cache or said lower level cache, said memory controller stores said associated data only within said controller memory.

17. The data processing system of claim 11, said memory controller further comprising:

means, responsive to a determination that a data request by the processor will not be serviced by said upper level cache or said lower level cache, for determining whether or not requested data specified by said data request is stored by said memory controller; and means, responsive to a determination that said requested data is stored by said memory controller, for transmitting said requested data to said processor.

18. The data processing system of claim 17, wherein said requested data comprises at least one instruction.

19. The data processing system of claim 11, wherein said upper level cache in integrated into said processor, and wherein all data transmitted on said processor bus by said memory controller is received by said lower level cache and said processor substantially concurrently.

* * * * *